No. 734,078.

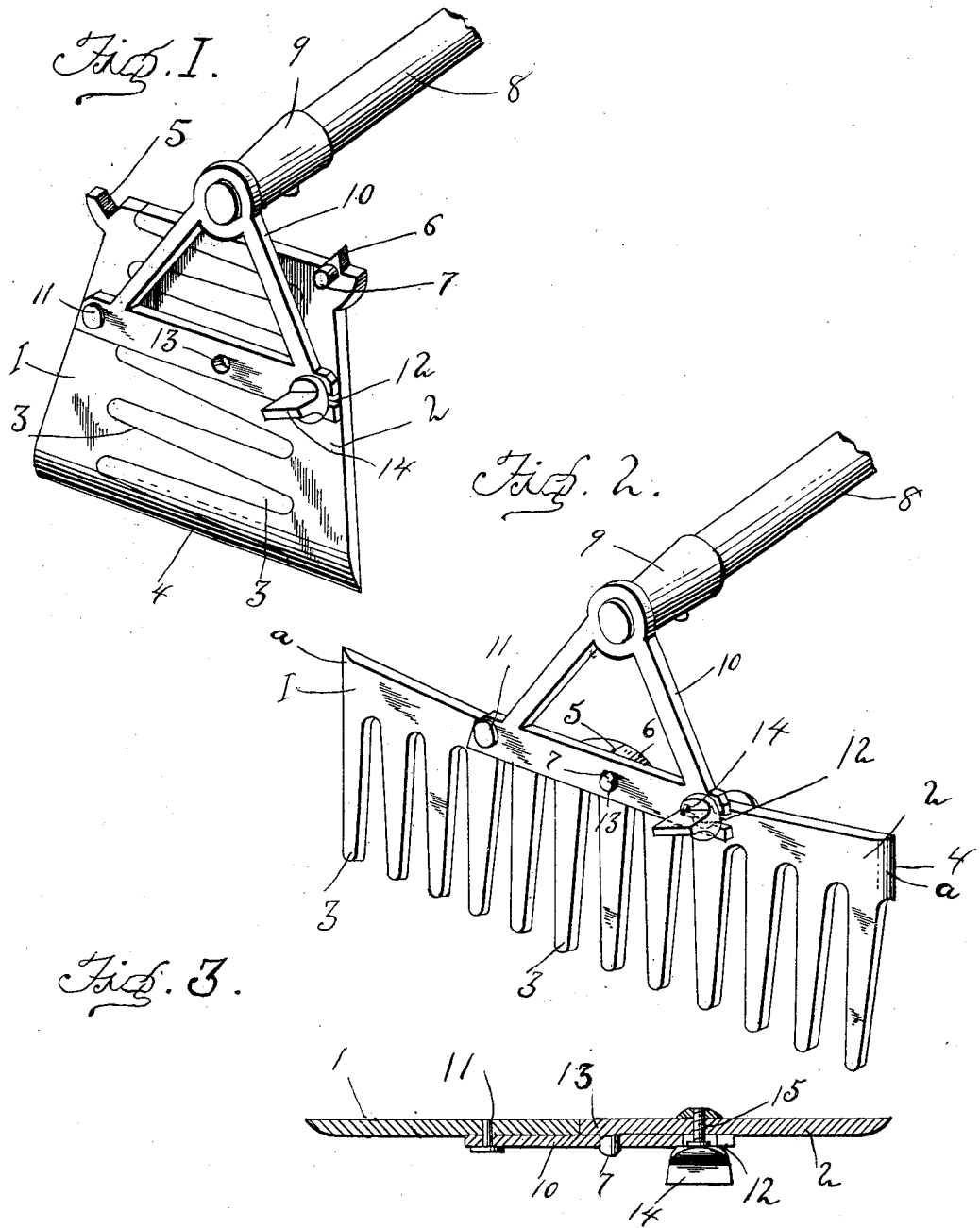

Patented July 21, 1903.

UNITED STATES PATENT OFFICE.

ALAN COLE MILLER, OF NEWARK, NEW JERSEY.

COMBINED RAKE AND HOE.

SPECIFICATION forming part of Letters Patent No. 734,078, dated July 21, 1903.

Application filed February 19, 1903. Serial No. 144,107. (No model.)

*To all whom it may concern:*

Be it known that I, ALAN COLE MILLER, a citizen of the United States, residing at Newark, in the county of Essex and State of New Jersey, have invented certain new and useful Improvements in a Combined Rake and Hoe; and I do declare the following to be a full, clear, and exact description of the invention, such as will enable others skilled in the art to which it appertains to make and use the same.

My invention relates to improvements in combined hoes and rakes; and it consists in the construction and combination of devices hereinafter described and claimed.

The object of my invention is to provide an improved implement which is exceedingly cheap and simple and which may be efficiently used at will both for the purpose of a hoe and a rake.

In the accompanying drawings, Figure 1 is a perspective view of my improved implement, showing the same with the parts assembled to form a hoe. Fig. 2 is a similar view of the same, showing the parts thereof assembled to form a rake. Fig. 3 is a sectional view taken on the plane indicated by the line *a a* of Fig. 2.

In the embodiment of my invention the blade of the implement is composed of a pair of separable sections 1 2, provided with interlapping elements 3, which are shaped to form tines for use when the implement is employed as a rake. One side of each of the sections 1 2 is sharpened, as at 4, to form a cutting edge. When the sections 1 2 are assembled to form a hoe-blade, the interlapping elements 3 thereof are in mutual engagement and the blade is formed with continuous unobstructed surfaces, the said interlapping elements 3 of the sections being exactly matched and each tapering toward its outer end, and hence said interlapping elements act as wedges to effect a tight connection between the sections 1 2 of the blade when the latter is used as a hoe.

The section 1 is provided at one of its corners with a notch 5, which is preferably V-shaped. The section 2 is provided at the corresponding corner with a projection or lug 6, the size and shape of which correspond with those of the notch 5, said lug 6 being adapted to enter said notch 5. Projecting outwardly from the section 2 and at the base of the lug 6 is a stud 7.

The handle 8 of the instrument, which may be of any suitable construction, is provided at its outer end with a ferrule 9, to the outer end of which is attached a head 10, here shown as triangular in form. Said head 10 may be of any suitable form or construction, and I do not limit myself in this particular.

The section 1 is here shown as pivotally connected at a point near its outer edge and between its ends to one corner of the head 10, as at 11. Hence said section 1 is angularly movable with reference to said head. The side or corner of the latter opposite the pivot 11 is here shown as provided with an opening-slot 12 and is provided at a point intermediate said slot and the opening which receives the pivot 11 with an opening 13, said latter opening being of such diameter as to adapt the stud 7 of section 2 to be snugly fitted therein.

A clamping-screw 14 is here shown as connected to the section 2 and adapted to engage and disengage the slot 12. Any suitable device may be substituted for the said clamping-screw within the scope of my invention, and I do not desire to limit myself in this particular.

When the sections 1 2 are assembled to form a hoe-blade with their interlapping elements 3 in mutual engagement, the clamping-screw 14 is in engagement with the slot 12, thus locking the hoe-blade to the head 10 and preventing angular movement of the hoe-blade with reference to the said head.

To adapt the implement for use as a rake, the set-screw 14 is released, the section 2 detached from the section 1, the latter turned to cause its notch 5 to register with the opening 15 of the head, and the section 2 is then reattached to the section 1 by causing its lug 6 to engage the notch 5, its stud 7 to engage and enter the opening 13 of the head, and its set-screw or clamping device 14 to enter the slot 12 of said head. Said set-screw or clamping device being then clamped, said section 2 is firmly locked to the head, as will be understood from an inspection of Fig. 2 of the drawings, and it will be further understood that the coengaging devices 5 6 of said sections 1 2 and the coengaging devices 7 13 of the head effectually prevent independent movement of the sections 1 2 and also prevent angular movement of either of them. I do not desire to limit myself to the precise construction and combination of devices herein shown and described, as it is evident that modifications may be made therein without departing from the spirit of my invention and within the scope of the appended claims.

Having thus fully described my invention, what I claim as new, and desire to secure by Letters Patent, is—

1. An agricultural implement, comprising a connecting element, a plurality of tool-sections, and means to attach them to the connecting element in different positions, said tool-sections having coengaging devices to interlock them in either of such positions, while so attached, substantially as described.

2. An agricultural implement comprising a connecting element, a plurality of tool-sections, and means to attach them to the connecting element in different positions, said tool-sections having coacting devices to secure them together in either of such positions while so attached, substantially as described.

3. An agricultural implement comprising a connecting element, a plurality of tool-sections, and means to attach them to the connecting element in different positions, said tool-sections having coacting interlapping devices to secure them together in either of such positions while so attached, substantially as described.

4. An agricultural implement comprising a connecting element, a tool-section pivotally connected thereto, and a tool-section detachably connected thereto, in different positions, said tool-sections having coacting devices to secure them together, in different positions while they are attached to the connecting element, substantially as described.

5. A convertible hoe and rake, comprising a head, and tool-sections, each of which is partly a hoe and partly a rake, said tool-sections having means to detachably connect them together in different positions, one of said tool-sections being pivotally attached to the head, and the other being attached to the head for angular movement and also for longitudinal movement toward and from the other tool-section, substantially as described.

In testimony whereof I have hereunto set my hand in presence of two subscribing witnesses.

ALAN COLE MILLER.

Witnesses:
WM. H. MILLER,
JOHN D. TOPPIN.